United States Patent [19]

Arai

[11] Patent Number: 4,788,590
[45] Date of Patent: Nov. 29, 1988

[54] RF CONVERTER EMPLOYING AN SAW FILTER

[75] Inventor: Seiichi Arai, Kyoto, Japan
[73] Assignee: Murata Mfg. Co., Ltd., Japan
[21] Appl. No.: 129,396
[22] Filed: Nov. 24, 1987

Related U.S. Application Data

[63] Continuation of Ser. No. 81,599, Aug. 3, 1987, abandoned, which is a continuation of Ser. No. 723,733, Apr. 16, 1985, abandoned.

[30] Foreign Application Priority Data

Apr. 17, 1984 [JP] Japan ................................. 59-77324

[51] Int. Cl.$^4$ ............................................. H04N 7/06
[52] U.S. Cl. ...................................... 358/143; 358/23
[58] Field of Search ................ 358/23, 142, 143, 188, 358/198, 330

[56] References Cited

U.S. PATENT DOCUMENTS

| | | | |
|---|---|---|---|
| 4,322,746 | 3/1982 | Oguino | 358/198 |
| 4,490,743 | 12/1984 | Mycynek et al. | 358/198 |
| 4,546,387 | 10/1985 | Glaab | 358/143 |
| 4,620,226 | 10/1986 | Cheung | 358/143 |

FOREIGN PATENT DOCUMENTS 0039408  8/1980  Japan ................................. 358/188
0017780  1/1984  Japan ................................. 358/143

OTHER PUBLICATIONS

Yamada & Uematsu, New Color TV Receiver with Composite SAW IF Filter Separating the Sound & Picture Signals, IEEE Transactions on Consumer Electronics, p. 192, vol. CE-28, No. 3, Aug. 1982.
Matsuura, Murata, Yuki & Hazama, Frequency Synthesizing Tuning Sys. with SAW Device, IEEE Trans. on Consumer Electronics, p. 404, vol. CE-26, Aug. 1980.
New Receiver Circuit Improves Sound Quality, p. 64, vol. 51, No. 2 (Feb. 1980), Radio Electronics.

*Primary Examiner*—Tommy P. Chin
*Attorney, Agent, or Firm*—Ostrolenk, Faber, Gerb & Soffen

[57] ABSTRACT

An RF converter includes a video modulator and a sound modulator. A modulated video signal from the video modulator and a modulated sound signal from the video modulator are mixed and conducted to a surface acoustic wave (SAW) filter constituted as a band pass filter, an RF television signal being the output of this surface acoustic wave filter. A high frequency side of the amplitude characteristic in the pass band of the surface acoustic wave filter is enhanced in comparison with a low frequency side thereof.

6 Claims, 1 Drawing Sheet

RF CONVERTER EMPLOYING AN SAW FILTER

This is a continuation of application Ser. No. 81,599 filed on Aug. 3, 1987, now abandoned, which was a continuation of application Ser. No. 723,733 filed on Apr. 16, 1985, now abandoned.

BACKGROUND OF THE INVENTION

1. Field of the Invention

The present invention relates to an RF converter for converting video and audio signals received from a video tape recorder (VTR), a video disc apparatus or the like, into an RF television broadcast signal, including a surface acoustic wave (SAW) band pass filter.

2. Description of the Prior Art

Conventionally, for improving VTR playback picture quality, a so-called video enhancer has been employed to reduce deterioration in resolution due to a loss of high frequency components of a video signal in video-recording or dubbing. Such a video enhancer, for instance, as disclosed on page 75 of the book entitled "NHK Home video Technique" edited by Nippon Hoso Kyokai and published in April, 1980, performs a high band boost of the video signal using, for example, a simple RC circuit or LC circuit. This conventional video enhancer has the disadvantage that the amplitude characteristic, namely, the frequency response characteristic is compensated, but the phase characteristic (group delay characteristic) is deteriorated, and thereby ringing is produced on the TV screen. Another system has also been proposed including a circuit called a "video corrector," which emphasizes the contour by operating the passing signal and the reflected signal of the delay line. However, this circuit, for instance, as disclosed on page 58 of Vol. 31 December/1983 of the magazine "Television Technique" published by Denshi Gijutsu Shuppan, has the disadvantage that the circuit configuration is complicated and a large number of parts are required.

SUMMARY OF THE INVENTION

Therefore, a principal object of the present invention is to provide an RF converter which can reduce deterioration of the picture resolution during VTR playback without requiring additional circuits as described above; and more particularly by employing an SAW filter system that is simpler than in the prior art.

In brief, the present invention relates to an RF converter wherein a surface acoustic wave filter is employed as a band pass filter and deterioration in the picture resolution is reduced by providing a suitable frequency characteristic thereof.

In accordance with the present invention, an arbitrary amplitude characteristic can be obtained because of using the surface acoustic wave filter as the band pass filter of the RF converter, and accordingly the deterioration in the resolution can be reduced simply. Furthermore, unlike the RC circuit or the LC circuit, in the surface acoustic wave filter, the phase characteristic thereof is not affected even when the amplitude characteristic is compensated, and accordingly no deterioration of the phase characteristic takes place, and therefore no trouble such as ringing or the like is produced on the TV screen.

These objects and other objects, features, aspects and advantages of the present invention will become more apparent from the following detailed description of the preferred embodiment of the present invention when taken in conjunction with the accompanying drawings.

DESCRIPTION OF THE PREFERRED EMBODIMENT

Figure 1:
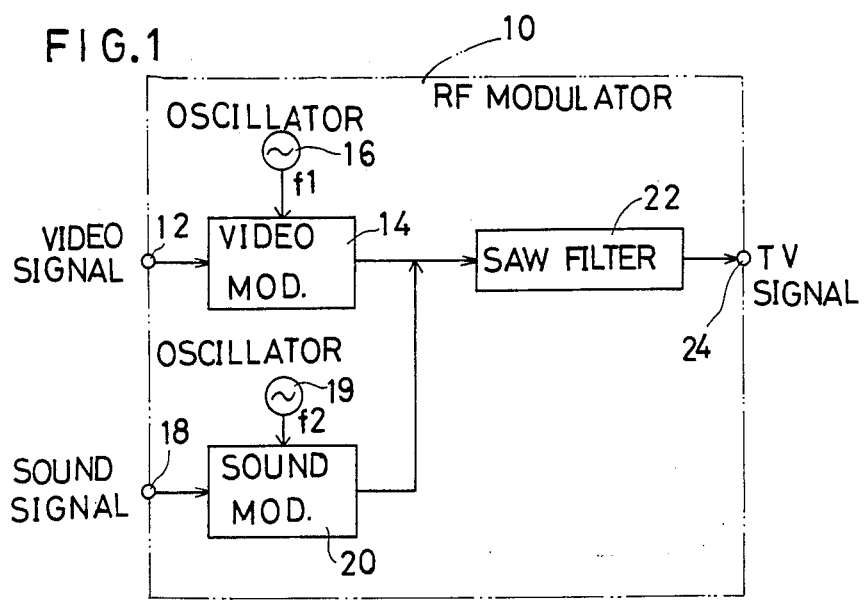
FIG. 1 is a block diagram showing one embodiment of an RF converter in accordance with the present invention.

FIG. 1 is a block diagram showing one embodiment of an RF converter in accordance with the present invention. During playback of a VTR or the like, an RF converter 10 converts a video signal and a sound signal into an RF television signal. The RF converter 10 comprises a video input terminal 12. A video signal inputted at this terminal 12 is conducted to a video modulator 14. A carrier wave for the video signal of a predetermined frequency fv (for example, 61.25 MHz-channel 3) from an oscillator 16 is provided to the video modulator 14. Accordingly, the output of the video modulator 14 is obtained as a modulated video signal. Also, the RF converter 10 comprises a sound input terminal 18, and the sound signal inputted at this terminal 18 is conducted to a sound modulator 20. A carrier wave for the sound signal of a predetermined frequency fS, for example, 65.75 MHz (=61.25 MHz+4.5 MHz) from an oscillator 19 is provided to this modulator 20. Accordingly, a modulated sound signal is outputted from the sound modulator 20.

The modulated video signal and the modulated sound signal from the modulators 14 and 20 are, respectively, superposed and transferred to an input of a surface acoustic wave filter 22 by an adder. This surface acoustic wave filter (SAW filter) 22 is constituted as a band pass filter. The output of the band pass filter, namely, the surface acoustic wave filter 22, is connected to an output terminal 24, and an output television signal or channel 3, for example, or optionally channel 4, is outputted thereby.

Figure 2:
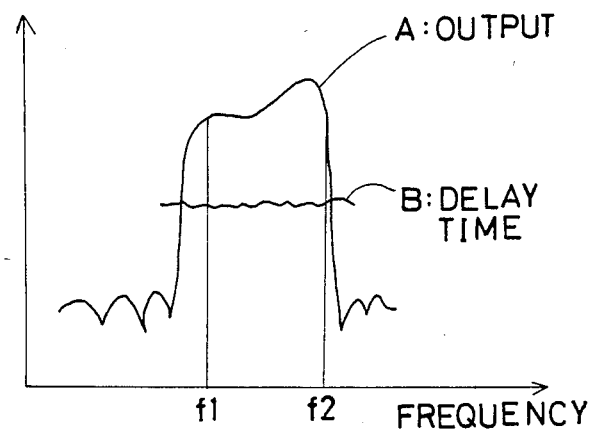
FIG. 2 is a graph showing one example of the frequency characteristic of an surface acoustic wave filter.

FIG. 2 is a graph showing one example of the frequency characteristic of a surface acoustic wave filter. The abscissa represents the frequency and the ordinate represents the output level and the group delay time. The surface acoustic wave filter 22 (FIG. 1) is constituted as a band pass filter, and the amplitude characteristic of the surface acoustic wave filter 22, as shown by the line A in FIG. 2, is enhanced in the high frequency side of the pass band in comparison with the low frequency side thereof. Since the frequency components of the high band in the pass band correspond to the high band components of the video signal after detection, resultingly the high band boost of the video signal can be performed by passing the signal through an SAW filter 22 having such a frequency characteristic. On the other hand, the group delay characteristic is nearly flat as shown by the line B in FIG. 2. The surface acoustic wave filter 22 is a transversal type filter, and therefore the amplitude characteristic and the phase characteristic thereof can be designed independently, and accordingly, even if the the amplitude characteristic is designed as desired, an optimum phase characteristic can be designed independent of the amplitude characteristic, and therefore the frequency characteristic as shown in FIG. 2 can be obtained easily.

A method of designing an SAW filter will now be described briefly.

The amplitude characteristic A in FIG. 2 is represented by a function A ($\omega$) of the angular frequency w, and the phase characteristic is used in place of the group delay characteristic B, being presented by a function $\theta(\omega)$. In order to have the characteristic as shown in FIG. 2, the surface acoustic wave surface acoustic wave filter is required to have an impulse response as represented by the following equation.

$$h(t) = \frac{1}{\pi} \int_0^\infty A(\omega)\cos\{\omega t - \theta(\omega)\}d\omega$$

A surface acoustic wave filter having the characteristic as shown in FIG. 2 can be obtained by making the position of the interdigital transducer and the length of superposing of the interdigital electrode correspond to the abovedescribed impulse response h(t).

A signal produced by AM-modulating the video carrier wave fv from the oscillator 16 with the video signal has side bands at both sides of the carrier frequency fv. When such an AM signal passes through the surface acoustic wave filter 22 having the frequency characteristic as shown in FIG. 2, and then is fed to the antenna input of a television receiver, the video signal after demodulation is enhanced in the high band thereof, and therefore the same effect as that of the so-called high band boost at the stage of the video signal by means of the video enhancer is obtained. Accordingly, deterioration of the high band components of the video signal caused by the frequency characteristic of the video tape itself is compensated, and reduction in resolution is avoided.

In the above-described embodiment, the description has assumed that the group delay characteristic of the surface acoustic wave filter 22 is nearly flat. However, this group delay characteristic can be arbitrarily varied as required. For example, when the phase characteristic is deteriorated before or after the RF converter, the phase characteristic thereof can to be compensated together with the amplitude characteristic by the surface acoustic wave filter 22 (FIG. 2). In this case, the group delay characteristic is not necessarily flat, and a suitable delay time is designed for the frequency band to be compensated.

Furthermore, the present invention is applicable to other video reproducing apparatus such as a video disc apparatus or the like, in addition to a video tape recorder mentioned above.

Although an embodiment of the present invention has been described and illustrated in detail, it is clearly understood that the same is by way of illustration and example only and is not to be taken by way of limitation, the spirit and scope of the present invention being limited only by the terms of the appended claims.

What is claimed is:

1. An RF converter for enhancing high band components of a video signal, comprising:
    first modulating means for modulating a video signal and outputting a modulated video signal having high band components and low band components,
    second modulating means for modulating a sound signal and outputting a modulated sound signal,
    combining means for combining said modulated video and sound signals and outputting a combined modulated signal, and
    means for enhancing said high band components of said modulated video signal, including a surface acoustic wave filter receiving said combined modulated signal and outputting a television signal, said filter having a pass band with a predetermined amplitude characteristic which is enhanced at a high frequency side thereof, and a predetermined group delay characteristic which is substantially constant over said pass band.

2. An RF converter for enhancing the picture resolution of a TV output signal, comprising
    first modulating means for receiving a low-frequency video signal and producing a modulated high-frequency video output signal;
    second modulating means for receiving low-frequency audio signal and producing a modulated high-frequency audio output signal;
    combining means for combining said modulated high-frequency video and audio output signals of said first and second modulating means and producing a combined high-frequency output signal with video and audio components; and
    filter means for receiving said combined high-frequency output signal and producing a TV output signal, said filter means comprising an SAW band pass filter with a pass band having enhanced amplitude response characteristics in an upper end thereof; and predetermined group delay characteristics over its pass band; for enhancing said video components in said upper end of said pass band, and thereby enhancing the picture resolution of said TV output signal.

3. An RF converter as in claim 2, wherein said SAW band-pass filter has substantially constant phase characteristics over its passband.

4. An RF converter as in claim 2, wherein the phase characteristics of said SAW band-pass filter vary over its passband.

5. An RF converter as in claim 2, wherein said TV output signal is a broadcast-type TV signal.

6. An RF converter as in claim 5, wherein said modulated high-frequency output signals are in the broadcast TV frequency range.

* * * * *